United States Patent
Olsson et al.

(10) Patent No.: US 9,998,909 B2
(45) Date of Patent: Jun. 12, 2018

(54) 3RD GENERATION DIRECT TUNNEL (3GDT) OPTIMIZATION

(75) Inventors: Lasse Olsson, Shanghai (CN); Juying Gan, Shanghai (CN); Xiao Li, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/126,471

(22) PCT Filed: Jun. 22, 2011

(86) PCT No.: PCT/EP2011/060432
§ 371 (c)(1),
(2), (4) Date: Dec. 16, 2013

(87) PCT Pub. No.: WO2012/175122
PCT Pub. Date: Dec. 27, 2012

(65) Prior Publication Data
US 2014/0112151 A1    Apr. 24, 2014

(51) Int. Cl.
*H04W 4/00* (2018.01)
*H04W 8/08* (2009.01)
*H04W 76/02* (2009.01)
*H04W 8/18* (2009.01)

(52) U.S. Cl.
CPC ........... *H04W 8/08* (2013.01); *H04W 76/022* (2013.01); *H04W 8/18* (2013.01)

(58) Field of Classification Search
CPC ............. H04L 12/26; H04W 4/00; H04B 7/00
See application file for complete search history.

(56) References Cited

U.S. PATENT DOCUMENTS

| | | | |
|---|---|---|---|
| 8,218,535 B1 * | 7/2012 | Hurtta | H04L 12/4633 370/338 |
| 8,400,950 B2 * | 3/2013 | Ko | H04B 7/0413 370/230 |
| 8,432,871 B1 * | 4/2013 | Sarnaik | H04W 28/0289 370/331 |
| 9,203,629 B2 * | 12/2015 | Momtahan | G06Q 30/00 |
| 2005/0243762 A1 | 11/2005 | Terry et al. | |
| 2008/0020775 A1 * | 1/2008 | Willars | H04L 47/10 455/445 |
| 2008/0049777 A1 * | 2/2008 | Morrill | H04W 24/02 370/420 |

(Continued)

FOREIGN PATENT DOCUMENTS

| | | |
|---|---|---|
| EP | 2299754 A1 | 3/2011 |
| WO | 2010039085 A1 | 4/2010 |
| WO | 2010057529 A1 | 5/2010 |

OTHER PUBLICATIONS

IEEESAEandEnhancedPacketCore.pdf, by Farooq Bari, Seattle communications (COM-19) Society Chapter Nov. 13, 2008.*
"Generic Policy Control for Local Breakout", IP.COM Journal, IP.COM Inc., West Henrietta, NY, US, Nov. 17, 2009, 12 pages, XP013135390.

(Continued)

*Primary Examiner* — Asad Nawaz
*Assistant Examiner* — Berhanu Belete
(74) *Attorney, Agent, or Firm* — Rothwell, Figg, Ernst & Manbeck, p.c.

(57) ABSTRACT

Example embodiments presented herein are directed towards a system, and corresponding method, for determining 3rd Generation Direct Tunnel (3GDT) usage based on the payload usage of a user.

19 Claims, 5 Drawing Sheets

(56) References Cited

U.S. PATENT DOCUMENTS

| | | | |
|---|---|---|---|
| 2008/0119160 A1* | 5/2008 | Andriantsiferana | H04M 15/00 455/406 |
| 2009/0197597 A1* | 8/2009 | Kotecha | H04W 8/082 455/433 |
| 2010/0085978 A1* | 4/2010 | Ramankutty | H04L 12/14 370/401 |
| 2010/0157887 A1* | 6/2010 | Kopplin | H04L 12/5695 370/328 |
| 2010/0281157 A1* | 11/2010 | Ramankutty | H04W 24/08 709/224 |
| 2010/0322068 A1* | 12/2010 | Grahn | H04W 76/021 370/217 |
| 2011/0002240 A1* | 1/2011 | Harel | H04L 45/02 370/254 |
| 2011/0070906 A1* | 3/2011 | Chami | H04L 45/22 455/507 |
| 2011/0075557 A1* | 3/2011 | Chowdhury | H04L 12/14 370/230 |
| 2011/0158090 A1* | 6/2011 | Riley | H04L 12/14 370/230 |
| 2011/0222430 A1* | 9/2011 | Angervuori | H04L 12/4633 370/252 |
| 2011/0267980 A1* | 11/2011 | Calippe | H04W 24/02 370/254 |
| 2012/0005332 A1 | 1/2012 | Beattie, Jr. et al. | |
| 2012/0020218 A1* | 1/2012 | Li | H04L 43/067 370/235 |
| 2012/0052866 A1* | 3/2012 | Froehlich | H04L 47/14 455/445 |
| 2012/0057463 A1* | 3/2012 | Hurtta | H04L 12/5692 370/236 |
| 2012/0106349 A1* | 5/2012 | Adjakple | H04W 52/0206 370/241 |
| 2012/0188895 A1* | 7/2012 | Punz et al. | 370/252 |
| 2012/0201137 A1 | 8/2012 | Le Faucheur et al. | |
| 2012/0208562 A1* | 8/2012 | Wilkin | H04L 41/12 455/456.3 |
| 2012/0226733 A1* | 9/2012 | Kim | H04L 67/00 709/201 |
| 2012/0317269 A1* | 12/2012 | Weppler | H04L 41/0654 709/224 |
| 2013/0208661 A1* | 8/2013 | Nylander | H04W 48/17 370/328 |
| 2014/0056235 A1 | 2/2014 | Liu et al. | |

OTHER PUBLICATIONS

"3rd Generation Partnership Project; Technical Specification Group Services and System Aspects; Local IP Access and Selected IP Traffic Offload (LIPA-SIPTO) (Release 10)", 3GPP Standard; 3GPP TR 23.829, 3rd Generation Partnership Project (3GPP), Mobile Competence Centre; 650, Route Des Lucioles; F-06921 Sophia-Antipolis Cedex; France No. V10.0.0, Mar. 29, 2011, pp. 1-43, XP050476492.

"3rd Generation Partnership Project; Technical Specification Group Core Network and Terminals;3GPP Evolved Packet System (EPS); Evolved General Packet Radio Service (GPRS) Tunnelling Protocol for Control plane (GTPv2-C); Stage 3 (Release 10)", 3GPP TS 29.274 V10.0.0 (Sep. 2010), 172 pages.

"3rd Generation Partnership Project; Technical Specification Group Core Network and Terminals; Policy and Charging Control over GX reference point (Release 10)",3GPP TS 29.212 V10.0.0 (Sep. 2010), 121 pages.

"3rd Generation Partnership Project; Technical Specification Group Core Network and Terminals; General Packet Radio Service (GPRS); GPRS Tunnelling Protocol (GTP) across the Gn and Gp interface (Release 10)", 3GPP TS 29.060 V10.0.0 (Dec. 2010), 162 pages.

3GPP TS 23.060 V11.0.0, "3rd Generation Partnership Project; Technical Specification Group Services and System Aspects; General Packet Radio Service (GPRS); Service description; Stage 2 (Release 11)", Dec. 2011, 326 pages.

Office Action dated May 22, 2015 in U.S. Appl. No. 13/816,109, 14 pages.

Office Action in related Japanese patent application 2014-555909 dated Sep. 29, 2015, with English translation, 5 pages.

3GPP TR 23.809 V1 .0.0, "3rd Generation Partnership Project: Technical Specification Group Services and System Aspects; One Tunnel Functional description; (Release 7)," XP-002449389, Sep. 2006, 50 pages.

ETSI TR 123 919 V7.0.0, "Digital Cellular Telecommunications System (Phase 2+); Universal Mobile Telecommunications System (UMTS); Direct Tunnel Deployment Guideline (3GPP TR 23.919 version 7.0.0 Release 7)," Jun. 2007, 13 pages.

Excerpt of Prosecution History for U.S. Appl. No. 13/816,109, dated May 22, 2015-Dec. 20, 2016, 99 pages.

Extended European Search Report in European Appln. No. 12868785.2 dated Nov. 25, 2015, 9 pages.

U.S. Non-final Office Action issued in U.S. Appl. No. 13/816,109 dated Apr. 26, 2018, 35 pages.

* cited by examiner

3RD GENERATION DIRECT TUNNEL (3GDT) OPTIMIZATION

CROSS-REFERENCE TO RELATED APPLICATION

This application is a 35 U.S.C. § 371 National Phase Entry Application from PCT/EP2011/060432, filed Jun. 22, 2011, and designating the United States.

TECHNICAL FIELD

Example embodiments presented herein are directed towards a system, and corresponding method, for determining 3rd Generation Direct Tunnel (3GDT) usage based on a payload usage of a user.

BACKGROUND

In a typical cellular system, also referred to as a wireless communications network, wireless terminals, also known as mobile stations and/or User Equipment units (UEs) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

Mobility management is an important function in maintaining cellular networks. The goal of mobility management is to track where cellular phones, or User Equipments (UEs), are located in order for mobile phone services to be provided to the various UEs comprised in any given network. The network nodes which are primarily responsible for mobility management are the Mobility Management Entity (MME) and the Serving General Packet Radio Service Support Node (SGSN).

Network capacity management is also an important function in maintaining cellular networks. 3G Direct Tunnel (3GDT) is a powerful way of increasing throughput capacity in the core network without extra investments in new network entities. When using 3GDT, the SGSN-MME is utilized to establish direct user plane tunnels for payloads between the RNC and the Gateway General Packet Radio Service Support Node (GGSN) within the General Packet Radio Service (GPRS) network, or between the RNC and the Serving Gateway (SGW) in the Evolved Packet System (EPS) network (where RNC is connected to S4 SGSN), in order to expand payload capacity.

SUMMARY

While 3GDT improves customer traffic needs, the use of 3GDT requires additional signaling procedures. This may result in increased network signaling which may affect the SGSN-MME (or SGSN), RAN, GGSN and the SGW. For example, network signaling may be increased the RNC is connected to the Gn/Gp SGSN and GGSN where the Direct Tunnel is switched to two tunnels (e.g., when Direct Tunneling is not possible).

Thus, at least one object of some of the example embodiments presented herein is to provide a method and/or system for 3GDT usage which reduces an amount of increased network signaling to at least the SGSN-MME (or SGSN), RAN, GGSN and/or the SGW.

Some of the example embodiments may be directed towards a method in a network node for 3rd Generation Direct Tunnel (3GDT) usage, the network node being comprised in a Radio Network. The method may comprise determining if a User Equipment (UE) is a heavy payload user. If the UE is a heavy payload user, the method may further comprise sending an information element in a communications message, the information element may provide an indication that the UE is a heavy payload user and 3GDT usage should be initiated.

Some example embodiments may further comprise the network node being a Gateway General Packet Radio Service Support Node (GGSN) or a Packet Data Network Gateway (PGW) network node. The method may further comprise determining if the UE is a heavy payload user based on a usage indication provided by the UE. Some example embodiments may further comprise determining if the UE is a heavy payload user based on an internal configuration in the network node.

Some example embodiments may further comprise sending the communications message to a Policy and Charging Rules Function (PCRF), a Service Aware Policy Controller (SAPC), and/or a Home Location Register (HLR) in order to confirm the UE heavy payload user status with a user subscription.

Some example embodiments may further comprise determining if the UE is a heavy payload user based on a usage indication provided by at least one other network node comprising UE based information.

Some example embodiments may further comprise determining if the UE is a heavy payload user based on a usage indication provided by at least one other network node, the at least one other network node being a Policy and Charging Rules Function (PCRF), a Service Aware Policy Controller (SAPC), and/or a Home Location Register (HLR).

Some example embodiments may further comprise obtaining UE subscription information, wherein the subscription information provides a heavy payload user indication.

Some example embodiments may further comprise evaluating a UE Call Data Record (CDR) and determining the heavy payload usage at least in part based on the CDR.

Some example embodiments may further comprise evaluating a mobility history of the UE.

Some example embodiments may further comprise the network node being the UE and obtaining an internal indication of the heavy payload user status. Some example embodiments may further comprise sending the communications message to a Gateway General Packet Radio Service Support Node (GGSN) or a Packet Data Network Gateway (PGW) network node.

Some example embodiments may further comprise sending the information element during an initial attach procedure, after a Packet Data Network (PDN) connection has already been established or during PDP Context Activation.

Some example embodiments may be directed towards a network node for 3rd Generation Direct Tunnel (3GDT) usage, the network node may be comprised in a Radio Network. The network node may comprise a status determination unit that may be configured to determine if a User Equipment (UE) is a heavy payload user. The network node may further comprise a communications port that may be configured to send, if the UE is a heavy payload user, an information element in a communications message. The information element may provide an indication that the UE is a heavy payload user.

According to some example embodiments, the network node may be configured to perform any of the method steps described above.

Some example embodiments may be directed towards a computer readable storage medium encoded with computer executable instructions, wherein the instructions, when executed by a network node, may perform any of the method steps described above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Figure 1:
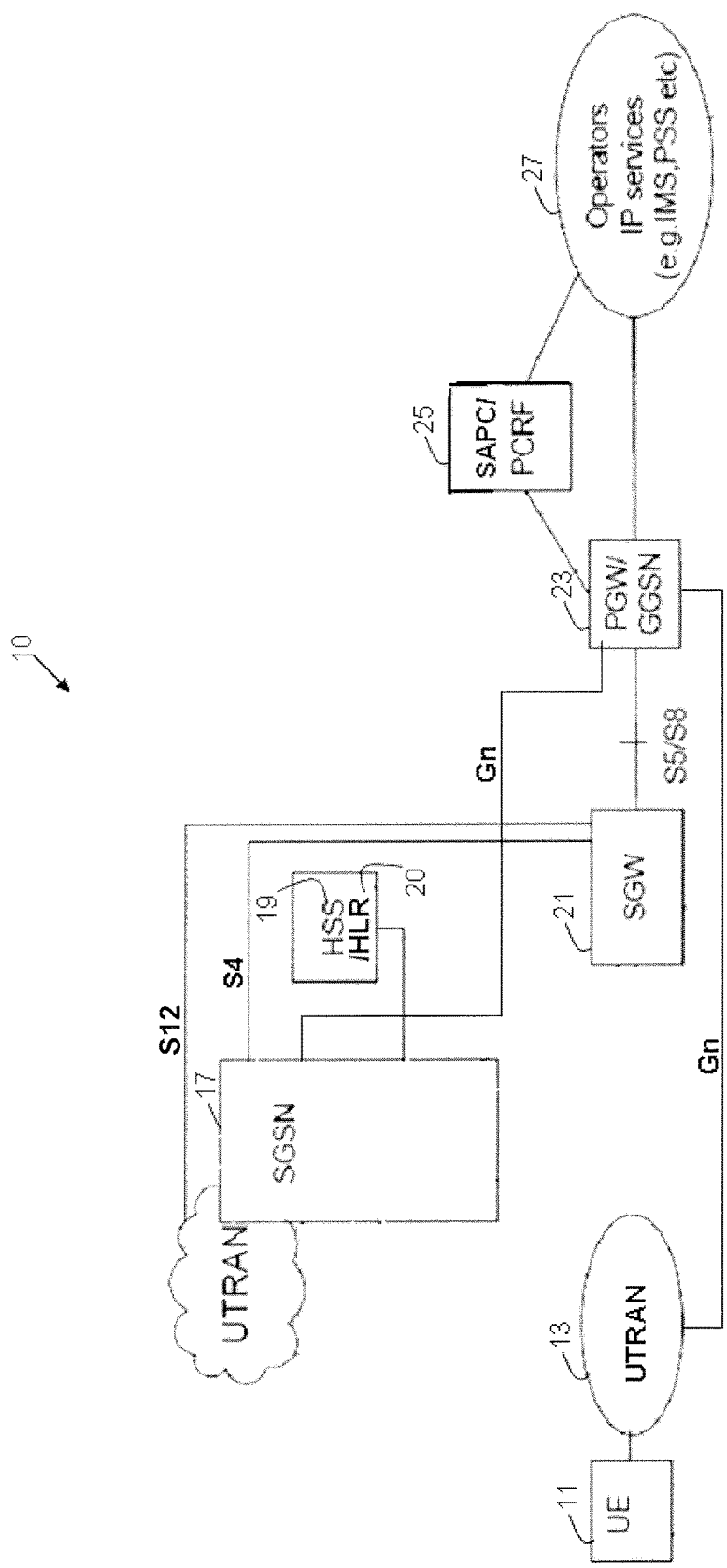
FIG. 1 is a schematic of a wireless network, according to some of the example embodiments.

FIG. 1 is a simplified illustration of an embodiment of a communication network 10. The communication network 10 is a telecommunication network using wireless and/or wired communication techniques. The communication network 10 may use technologies such as LTE, UMTS, etc. It should be noted that the communication links in the communication network 10 may be any communication link known in the art, for example, either a wired or wireless radio link. The link may use any suitable protocol depending on type and level of layer, e.g. as indicated by the Open System Interconnection (OSI) model, as understood by the person skilled in the art.

As shown in the communication network 10, a user equipment 11 may be connected to a radio access network, such as an UTRAN 13. The UTRAN 13 may comprise base station(s) (not shown), such as e.g. a NodeB or any other network unit capable of communicating over a radio carrier with the user equipment 11.

The user equipment 11 may be any suitable communication device or computational device with communication capabilities capable to communicate with a base station over a radio channel, for example but not limited to, a mobile phone, smart phone, Personal Digital Assistant (PDA), laptop, MP3 player or portable Digital Video Disc (DVD) player, or similar media content devices, digital camera, or even stationary devices such as a Personal Computer (PC). A PC may also be connected via a mobile station as the end station of the broadcasted/multicasted media. The user equipment 11 may be referred to as UE in some of the drawings.

The communication network 10 comprises a mobility management unit, e.g. mobility management entity (MME) and/or a Serving General Packet Radio Service Support Node (SGSN) 17. The SGSN-MME or SGSN 17 may be responsible for authenticating the user equipment 11 by interacting with a subscription unit, e.g. a Home Subscriber Server (HSS) 19 and/or Home Location Register (HLR) 20.

The SGSN-MME or SGSN 17 may be connected to a Serving Gateway (SGW) 21. S4 is the interface between the SGSN 17 and the SGW 21. The SGW 21 may act as a mobility anchor and routes and forwards user plane data between a Packet Data Network Gateway (PGW)/General Packet Radio Service Support Node (GGSN) 23 and the RNC 13. The SGW 21 may get instructions from the SGSN-MME or SGSN 17 to establish, modify and/or release Evolved Packet System (EPS) bearers.

The PGW/GGSN 23 is the interface between the internal Internet Protocol (IP) network of the operator and external networks 27, i.e. the PGW/GGSN 23 provides connectivity between the user equipment 11 and external PDN 27. A user equipment 11 may have simultaneous connectivity with more than one PGW/GGSN 23 for accessing multiple PDNs. The interface between the PGW/GGSN 23 and the SGW 21 is called S5/S8.

The Policy and Charging Rules Function (PCRF)/Service-Aware Policy Controller (SAPC) 25 is connected between the PGW/GGSN 23 and an operator's IP services 27, such as e.g. IP Multimedia Subsystem (IMS), packet switch streaming (PSS) etc., and takes care of policy and charging issues between the user equipment 11 and the operator.

It should be appreciated that the network 10 is configured with cabling, routers, switches, and other network building elements (not shown) as understood by the skilled person, for instance as used for building an Ethernet or WAN network.

When a UE 11 connects to the core network in order to engage in the transfer of data, the UE 11 may first initiate an attach procedure and thereafter establish a Packet Data Network (PDN) connection. Once a PDN connection is established, the UE will be provided an IP address and will therefore be able to send and receive payload data.

A typical path of data flow between the UE 11 and the operator 27 is from the UE 11, to a base station NodeB node (comprised within the RNC 13), to the SGSN 17, to the GGSN 23, and thereafter to the operator 27. In an attempt to expand payload capacity, 3rd Generation Direct Tunnel (3GDT) may be introduced.

Through the use of 3GDT, the SGSN 17 may be excluded from the path of data between the UE 11 and the operator 27. While this increases the payload capacity in the network, the use of 3GDT increases signaling in the network. Thus, it is not beneficial to continuously employ 3GDT. For example, the 3GDT function may be suited for stationary users downloading and/or uploading large data volumes (referred to herein as heavy users).

In determining when 3GDT usage should be applied typical methods comprise 3GDT usage being applied to user equipments associated with a designated Access Point Name (APN), RNC, or GGSN. 3GDT usage may also be determined based on a specific Type Allocation Code (TAC) in the International Mobile station Equipment Identity Software Version (IMEISV).

The above solutions for determining 3GDT usage are static. Specifically, current methods of 3GDT usage assume that users associated with the same APN or TAC will have the same behavior in terms of data volume usage and will therefore be provided with the same treatment regarding 3GDT. Furthermore, prior art methods do not account for the possibility that a user may change its usage status (i.e., a user may not always be a heavy user). With increased demands of payload data transfer on the network, this assumption is no longer valid.

Figure 2:
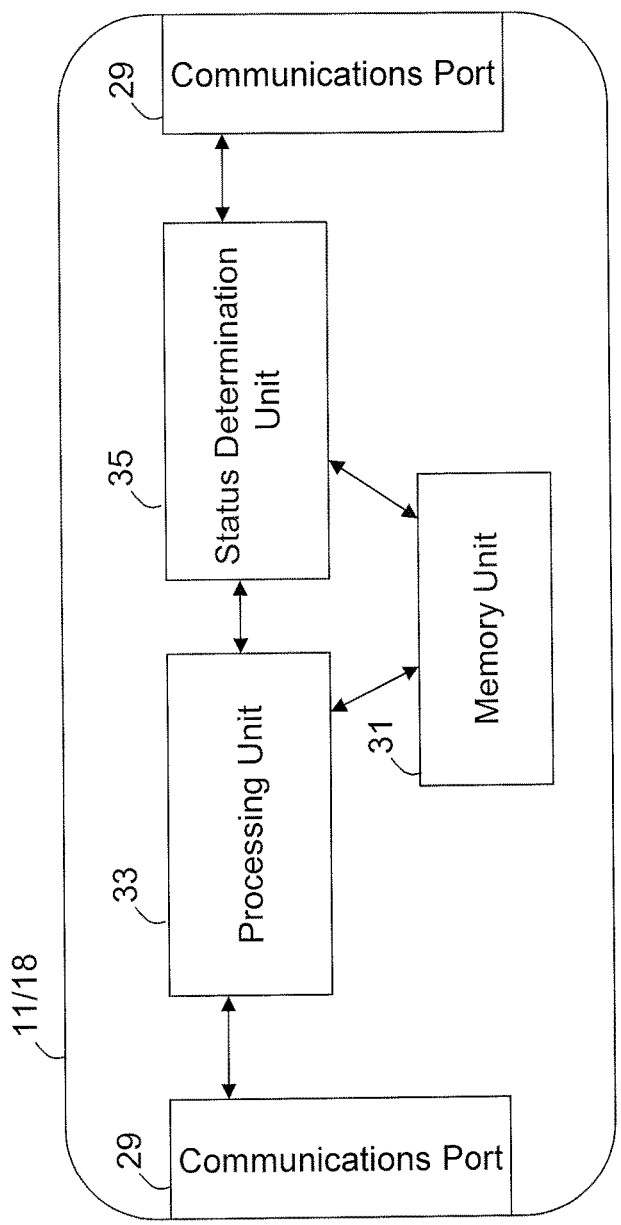
FIG. 2 is a schematic of a network node, according to some of the example embodiments.
Figure 3:
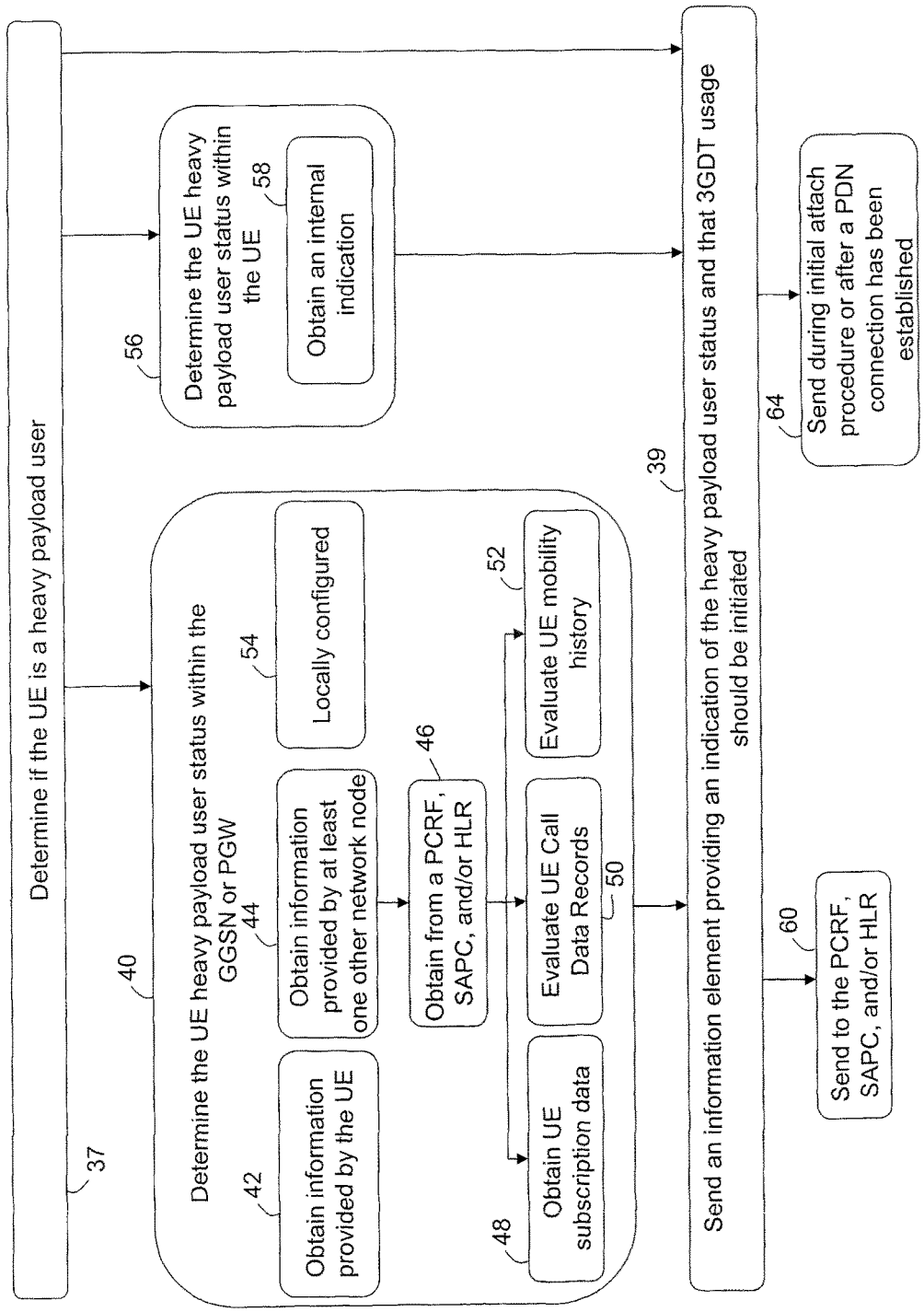
FIG. 3 is a flow diagram depicting example operations which may be executed by the network node of FIG. 2, according to some of the example embodiments.

Thus, some of the example embodiments presented herein may be directed towards dynamically determining 3GDT usage based on a payload usage of a user. FIG. 2 illustrates a network node which may utilize some of the example embodiments presented herein. FIG. 3 depicts a flow diagram of example operations that may be taken by the network node of FIG. 2.

In some example embodiments the network node may be the UE 11 and/or the PGW/GGSN 23. The network node 11/23 may comprise any number of communication ports 29 that may be able to transmit or receive any number or type of signals and/or data. It should be appreciated that the network node may alternatively comprise a single transceiver port. It should further be appreciated that the communication ports 29 or transceiver port may be in the form of any input/output communications port known in the art.

The network node 11/23 may also comprise at least one memory unit 31. The memory unit 31 may be configured to store received, transmitted, and/or measured data and/or executable program instructions. The memory unit 31 may be any suitable type of computer readable memory and may be of volatile and/or non-volatile type.

The network node 11/23 may further comprise a general processing unit 33. The network node 11/23 may also comprise a status determination unit 35. The status determination unit 35 may be configured to determine a payload usage status of a user. Specifically, the status determination unit 35 may be able to identify whether or not a user should be classified as a heavy user.

It should be appreciated that the general processing unit 33 and status determination unit 35 need not be comprised as separate units. Furthermore the generally processing unit 33 and the status determination unit 35 may be any suitable type of computation unit, e.g. a microprocessor, digital signal processor (DSP), field programmable gate array (FPGA), or application specific integrated circuit (ASIC).

During operation, the status determination unit of the network node 11/23 may be configured to determine if the UE 11 is a heavy payload user (37). It should be appreciated that the determination may be made during an initial procedure or at any time after a PDN connection has already been established.

In some example embodiments the network node may be a PGW/GGSN 23 network node. In such instances, the determination of whether or not the UE 11 is a heavy payload user may be provided by information supplied by the UE 11 itself (42). For example, during an attach request, the UE 11 may send an information element in an attach request message. The information element may comprise an indication that the user if a heavy payload user. Similarly, the UE 11 may also send an information element after a PDN connection has already been established.

In some example embodiments, the PGW/GGSN 23 may be informed of the UE 11 heavy payload status from other nodes in the network (44). Specifically, the PGW/GGSN 23 may obtain a payload usage status of the UE 11 from the Policy and Charging Rules Function (PCRF), a Service Aware Policy Controller (SAPC), and/or a Home Location Register (HLR), as well as any other node, or database featuring UE information, in the network (46). For example, during PDN establishment, the PWG/GGSN 23 may communicate with any of the PCRF, SAPC, and/or HLR in an attempt to gather service, credit, or any other form of UE specific information. Thus, in the transmission of the UE specific data, the PCRF, SAPC, and/or HLR may also provide an information element indicating the heavy payload status of the UE.

Such status information may be obtained through user subscription data (48). For example, the payload status may be determined through a fair usage package. With a fair usage package, the subscriber (or UE) may choose a specific volume package, whereas subscribers which choose larger volume packages may be deemed as heavy payload users.

The status information may also be determined by user Call Data Records (CDR) (50). Operators typically have volume CDR readily available for each user. Thus, by checking the data volume in the CDR, the operator may provide a heavy payload status for a specific UE based on the data volume associated with the UE. Such information may be obtained from the operator 27 and/or SPAC/PCRF 25.

It should also be appreciated that the status information may also be determined based on UE mobility history (52). UEs which demonstrate less mobility may be more suitable for 3GDT. UE mobility history may be obtained from the PGW/GGSN 23.

In some example embodiments, the PGW/GGSN 23 may be informed of the UE 11 heavy payload status from information which may be locally configured in the PGW/

GGSN 23. Specifically, information regarding the heavy payload status of specific UEs may be determined by the operator and thereafter stored locally in the PGW/GGSN 23.

In other example embodiments, the network node may be the UE 11. In such instances, the determination of whether or not the UE 11 is a heavy payload user (56) may be obtained from locally configured information (58). For example, this information may be configured by a service provider or operator.

Once the UE 11 has been indicated as a heavy payload user, the network node 11/23 may thereafter be configured to send a communications message which may comprise an information element providing an indication of the heavy payload status and that 3GDT usage should be initiated (39). The communications port 29 may be configured to send the communications message or information element.

In some example embodiments, the network node (e.g., the PGW/GGSN 23) may be configured to send the communications message, which may comprise an information element, to the Policy and Charging Rules Function (PCRF), a Service Aware Policy Controller (SAPC), and/or a Home Location Register (HLR) (60). The PGW/GGSN 23 may send such a communications message in order to verify the heavy payload status of the user. The PGW/GGSN 23 may also send the communications message in order to notify the PCRF, SAPC, and/or HLR of the 3GDT usage. Such a message may be sent, for example, if the indication of the status does not originate from the PCRF, SAPC, and/or HLR.

It should be appreciated that the network node 11/23 may be configured to send the various communications messages discussed above, which may comprise the information element, during an initial attach procedure or after a PDN connection has already been established (64). For example, if the UE 11 is anticipating a period of heavy payload usage, after a PDN connection has been established, the UE 11 may send a message comprising the heavy payload indication to the PGW/GGSN 23. The heavy usage status may be decided or provided by a service provider.

In some example embodiments the heavy payload status may be determined by measuring UE payload activity by, for example, the operator, UE, PGW/GGSN and/or SGSN-MME or SGSN. Thus, if the payload activity surpasses a user programmable threshold, the UE may be assigned as a heavy payload user. Similarly, if the payload activity of the UE falls below the user programmable threshold, the UE may lose its heavy payload user status and 3GDT usage may be terminated. Thus, some of the example embodiments provided herein allow for the dynamic determination of 3GDT usage.

Figure 4:
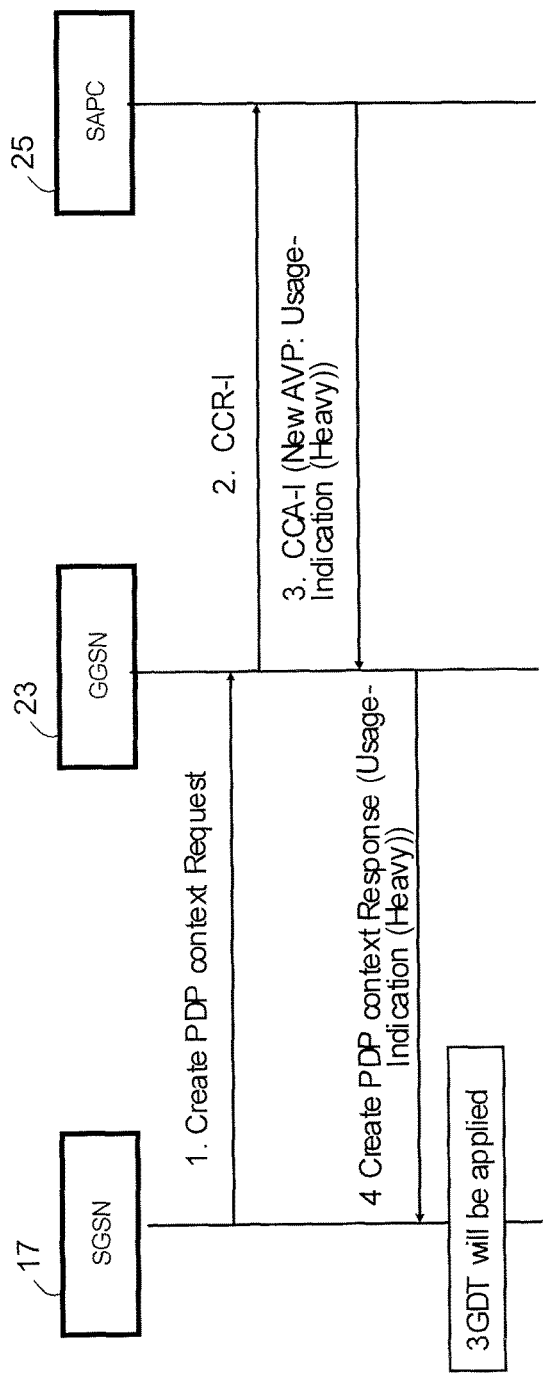
FIGS. 4 and 5 are message sequence diagrams depicting example messages from the network nodes of FIGS. 1 and 2, according to some of the example embodiments.

FIG. 4 illustrates a message sequence diagram depicting 3GDT usage in a GPRS network. Upon reception of a UE 11 initiated PDP context activation, the SGSN 17 may be configured to send a create PDP context request to the GGSN 23 (message 1). The GGSN 23 may thereafter send a Credit Control Request (CCR) message to the PCRF or SAPC 25 (message 2). By sending the CCR message, the GGSN 23 may interact with the PCRF in order to get the policy and authorized Quality of Service (QoS). The PCRF or SAPC 25 may then send a Credit Control Answer (CCA) message to the GGSN 23 (message 3). In sending the CCA message, the PCRF may provide the requested policy and authorized QoS. The PCRF may also provide information as to whether or not the UE 11 is a heavy user. This information may be based as discussed above (48, 50, 52). It should be appreciated that the information may be sent with the use of an information element.

Thereafter the GGSN 23 may send a create PDP context Response message to the SGSN 17 (message 4). The PDP context Response message may also comprise an information element indicating the heavy payload usage status of the UE 11. Thus, the GGSN 23 may carry the indication of the heavy usage user to the SGSN (as example in the Private Extension).

Figure 5:
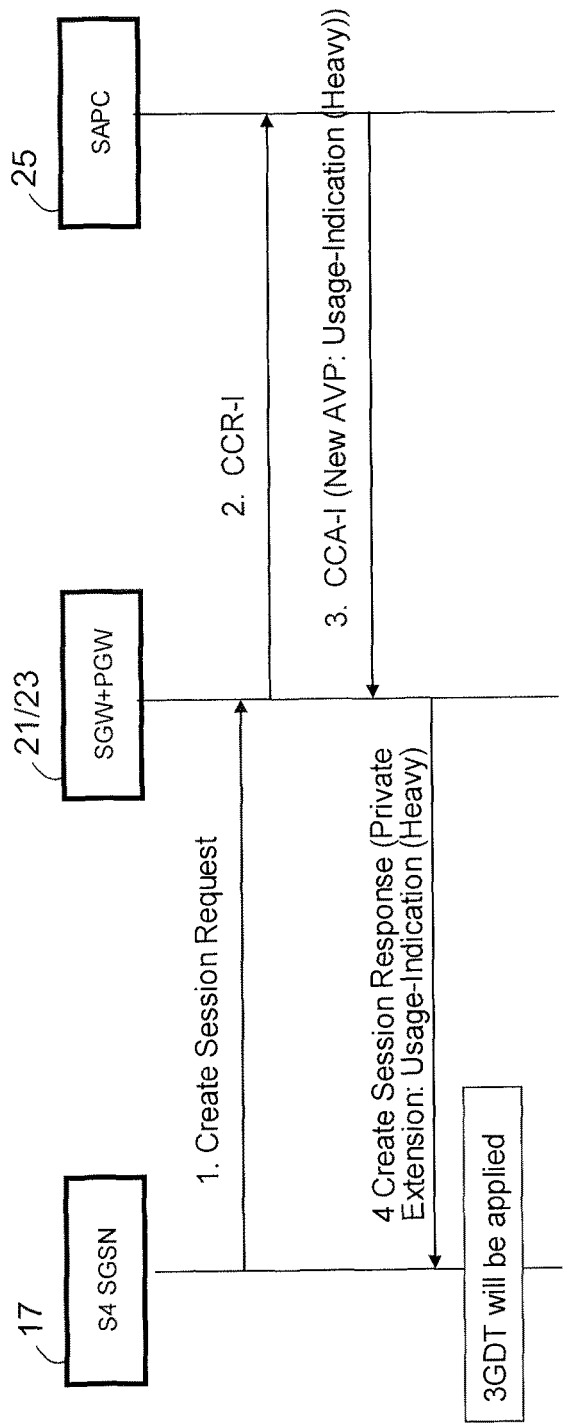

FIG. 5 illustrates a message sequence diagram depicting 3GDT usage in an EPC network. As should be appreciated from the GPRS example provided in FIG. 4, the example embodiments described above may function in a similar manner in an EPC network. It should be appreciated that in an EPC network environment the GTP messages will be different. It should also be appreciated that the messages illustrated in FIGS. 4 and 5 have been provided as non-limiting examples.

The above mentioned and described embodiments are only given as examples and should not be limiting to the present invention. Other solutions, uses, objectives, and functions within the scope of the invention as claimed in the below described patent claims should be apparent for the person skilled in the art.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be comprised within the scope of this disclosure. Although specific terms may be employed herein, they are used in a generic and descriptive sense only and not for purpose of limitation.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

A "device" as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, smart phone, touch phone, tablet computer, etc.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVD), flash memory, EEPROM, etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. Such instructions may be executed by the processing unit, e.g., central processing unit, microcontroller, microprocessor, field programmable gate array, application specific integrated circuit, digital signal processor, etc. The particular sequence of such executable instructions or associated data structures represents examples of corresponding acts for implementing the functions described in such steps or processes.

The invention claimed is:

1. A method in a first network node for 3rd Generation Direct Tunnel (3GDT) usage, the method comprising:
   the first network node determining that a user equipment (UE) is expected to transmit or receive an amount of data that exceeds a data volume threshold, thereby determining that the UE is a heavy payload user; and
   the first network node, in response to determining that the UE is expected to transmit or receive an amount of data that exceeds the data volume threshold, sending to a second network node a communications message comprising an information element (IE), the IE providing an indication that the UE is a heavy payload user and usage of a 3rd Generation Direct Tunnel (3GDT) between a Radio Network Controller (RNC) and a network gateway should be initiated, wherein
   the second network node is configured such that, in response to receiving the communication message comprising the IE, the second network node uses information included in the IE to determine that the UE is a heavy payload user and, in response to determining that the UE is a heavy payload user based on the information included in the IE, the second network node initiates a procedure for establishing the Direct Tunnel between the RNC and the network gateway;
   wherein the first network node is selected from a group consisting of: a Gateway General Packet Radio Service Support Node (GGSN) and a Packet Data Network Gateway (PGW) network node,
   the method further comprises the first network node sending to a third network node a subscription information request requesting subscription information associated with the UE, wherein the third network node is configured to respond to the subscription information request by transmitting to the first network node the subscription information associated with the UE, said subscription information associated with the UE comprising information identifying an authorized Quality of Service (QoS) for the UE, and
   the step of determining that UE is expected to transmit or receive an amount of data that exceeds the data volume threshold comprises determining whether the received subscription information further comprises a heavy payload indicator indicating that the UE is expected to transmit or receive an amount of data that exceeds the data volume threshold.

2. The method of claim 1, wherein the third network node is selected from a group consisting of: a Policy and Charging Rules Function (PCRF) and a Service Aware Policy Controller (SAPC).

3. The method of claim 1, wherein the determining comprises obtaining UE subscription information, wherein the UE subscription information provides an indication that the UE is expected to transmit or receive an amount of data that exceeds the data volume threshold.

4. The method of claim 1, wherein the determining comprises evaluating a UE Call Data Record (CDR) and determining the heavy payload usage at least in part based on the CDR.

5. The method of claim 1, wherein the determining comprises evaluating a history of the UE.

6. The method of claim 1, wherein the sending occurs during an initial attach procedure, after a Packet Data Network (PDN) connection has already been established, or when a PDP Context is activated.

7. The method of claim 1, further comprising establishing said Direct Tunnel between the RNC and the packet data network gateway in response to receiving said information element.

8. The method of claim 1, wherein the first network node determines that the UE is expected to transmit or receive an amount of data that exceeds the data volume threshold by determining whether the UE's payload activity surpasses a threshold.

9. The method of claim 1, wherein the first network node is the packet data network gateway.

10. The method of claim 1, wherein the first network node sends said communication message comprising said IE to a Serving GRPS Support Node (SGSN).

11. The method of claim 10, further comprising:
    the first network node transmitting a request to a policy node,
    the first network node receiving an answer transmitted by the policy node as a result of the policy node processing said request, wherein
    the answer transmitted by the policy node comprises information indicating that the UE is expected to transmit or receive an amount of data that exceeds the data volume threshold, and
    the first network node sends said communication message to said SGSN as a result of receiving the answer transmitted by the policy node.

12. A first network node for 3rd Generation Direct Tunnel (3GDT) usage, the first network node comprising a processing unit and a memory unit, wherein the first network node is configured to:
    determine if a user equipment (UE) is expected to transmit or receive an amount of data that exceeds a data volume threshold, thereby determining whether the UE is a heavy payload user; and
    send to a second network node a communications message containing an information element (IE) providing an indication that the UE is a heavy payload user in response to the first network node determining that the UE is expected to transmit or receive an amount of data that exceeds the data volume threshold, wherein
    the IE comprises information that enables the second node to determine that the UE is a heavy payload user,
    the second node is configured such that, in response to receiving the communication message, the second network node uses said information included in the IE to determine that the UE is a heavy payload user and, in response to determining that the UE is a heavy payload user based on the information included in the IE, the second network node initiates a procedure for establishing a 3rd Generation Direct Tunnel between a Radio Network Controller (RNC) and a network gateway;
    the first network node being selected from a group consisting of: a Gateway General Packet Radio Service Support Node (GGSN) and a Packet Data Network Gateway (PGW) network node, the first network node is configured to perform the determining by obtaining UE subscription information for the UE and determining whether the obtained UE subscription information for the UE provides an indication that the UE is expected to transmit or receive an amount of data that exceeds the data volume threshold, the first network node is configured to obtain the UE subscription information by transmitting a subscription information request to a third network node that maintains UE subscription information for a plurality of UEs, and the obtained UE subscription information for the UE comprises quality of service (QoS) information identifying an authorized QoS for the UE.

13. The first network node of claim 12, wherein:

the first network node is selected from a group consisting of: a Gateway General Packet Radio Service Support Node (GGSN) and a Packet Data Network Gateway (PGW) network node, and the first network node is configured to determine whether the UE is expected to transmit or receive an amount of data that exceeds the data volume threshold user based on one or more of: a usage indication provided by the UE, an internal configuration in the first network node, and a usage indication provided by at least one other network node comprising UE based information.

14. The first network node of claim 13, wherein determining further comprises determining whether the UE is expected to transmit or receive an amount of data that exceeds the data volume threshold based on a usage indication provided by at least one other network node, the at least one other network node being one or more of: a Policy and Charging Rules Function (PCRF) and a Service Aware Policy Controller (SAPC).

15. The first network node of claim 12, wherein the first network node is configured to perform the sending during an initial attach procedure, after a Packet Data Network (PDN) connection has already been established, or when a PDP Context is activated.

16. The first network node of claim 12, wherein the first network node is configured to send the communications message to the second node, the second node being selected from a group consisting of: a Gateway General Packet Radio Service Support Node (GGSN) and a Packet Data Network Gateway (PGW) network node.

17. The first network node of claim 12, wherein the determining further comprises evaluating a UE Call Data Record (CDR) and using the UE CDR to determine if the UE is expected to transmit or receive an amount of data that exceeds the data volume threshold.

18. The first network node of claim 12, wherein the determining further comprises evaluating a history of the UE.

19. A computer program product comprising a non-transitory computer readable medium storing computer instructions, the computer instructions comprising:

instructions, configured to be performed by a first node, for determining whether a user equipment (UE) is expected to transmit or receive an amount of data that exceeds a data volume threshold, thereby determining whether the UE is a heavy payload user;

instructions for transmitting to a third network node a subscription information request requesting subscription information associated with the UE, wherein the third network node is configured to respond to the subscription information request by transmitting to the first network node the subscription information associated with the UE, said subscription information associated with the UE comprising information identifying an authorized Quality of Service (QoS) for the UE; and instructions for sending to a network node a communications message to a second node in response to determining that the UE is a heavy payload user, wherein the communications message provides an indication that the UE is a heavy payload user and usage of a 3rd Generation Direct Tunnel (3GDT) between a Radio Network Controller (RNC) and a packet data network gateway should be initiated, wherein the communication message comprises information that enables the second node to determine that the UE is a heavy payload user, the second node is configured such that, in response to receiving the communication message, the second network node uses information included in the communication message to determine that the UE is a heavy payload user and, in response to determining that the UE is a heavy payload user based on the information included in the message, the second network node initiates a procedure for establishing a 3rd Generation Direct Tunnel between the RNC and a network gateway, the first network node is selected from a group consisting of: a Gateway General Packet Radio Service Support Node (GGSN) and a Packet Data Network Gateway (PGW) network node, and the step of determining that UE is expected to transmit or receive an amount of data that exceeds the data volume threshold comprises determining whether the received subscription information further comprises a heavy payload indicator indicating that the UE is expected to transmit or receive an amount of data that exceeds the data volume threshold.

* * * * *